United States Patent [19]
Hiramatsu et al.

[11] Patent Number: 4,732,253
[45] Date of Patent: Mar. 22, 1988

[54] POWER TRANSMISSION

[75] Inventors: Takeo Hiramatsu, Nagaokakyo; Bonnosuke Takamiya, Joyo; Yoshimasa Nagayoshi, Kyoto, all of Japan

[73] Assignee: Mitsubishi Jidosha Kogyo Kabushiki Kaisha, Tokyo, Japan

[21] Appl. No.: 901,673

[22] Filed: Aug. 29, 1986

[30] Foreign Application Priority Data

Aug. 31, 1985 [JP] Japan ................................ 60-192282

[51] Int. Cl.$^4$ ..................... F16D 25/063; F16D 25/10
[52] U.S. Cl. ........................ 192/87.11; 192/48.91; 192/85 AA; 192/87.15; 192/106 F
[58] Field of Search .............. 192/106 F, 87.15, 87.12, 192/87.1, 87.14, 87.11, 86, 103 F, 85 AA, 48.91

[56] References Cited

U.S. PATENT DOCUMENTS

| | | | |
|---|---|---|---|
| 2,381,786 | 8/1945 | Tyler | 192/106 F |
| 2,919,778 | 1/1960 | Aschauer | 192/86 |
| 3,554,057 | 1/1971 | Michnay et al. | 192/87.11 X |
| 3,747,727 | 7/1973 | Dach et al. | 192/87.11 X |
| 4,573,560 | 3/1986 | Eguchi | 192/87.1 |

OTHER PUBLICATIONS

ZF Transmission Publication, pp. 3–15 (no date).
"Design Practices—Passenger Car Automatic Transmissions"—Part 1, SAE, p. 97, Copyright 1962.

Primary Examiner—Rodney H. Bonck
Attorney, Agent, or Firm—Schwartz & Weinrieb

[57] ABSTRACT

A power transmission includes two piston-type actuators for selectively engaging and releasing their associated clutches. Each of the actuators is designed in such a way that in order to compensate a centrifugal hydraulic pressure to be developed in a working fluid chamber by a remaining hydraulic fluid upon release of the clutch, a centrifugal hydraulic pressure chamber is formed on the side opposite to the working fluid chamber relative to a piston and a centrifugal hydraulic pressure equal to the centrifugal hydraulic pressure in the working fluid chamber is produced in the centrifugal hydraulic pressure chamber. A partition forming the centrifugal hydraulic pressure chamber also serves as a cylinder forming the working fluid chamber of the other actuator.

5 Claims, 6 Drawing Figures

POWER TRANSMISSION

BACKGROUND OF THE INVENTION

(1) Field of the Invention

This invention relates to an improvement in a power transmission, more particularly to an improvement in a power transmission which makes use of one or more centrifugal hydraulic-pressure compensating clutches which can be suitably incorporated in an automatic transmission.

(2) Description of the Prior Art

An automatic transmission for a vehicle engine is generally constructed as a combination of a torque converter and a change speed gear assembly. The change speed gear assembly in turn includes a plurality of hydraulic clutches so as to perform the connection or disconnection between an associated drive element and driven elements by either supplying or discharging hydraulic fluid to or from their corresponding hydraulic cylinders. A desired shift position can be selected by suitably engaging or releasing these clutches. In other words, the shifting can be achieved by selectively connecting or disconnecting plural frictional engaging elements. Many of such frictional engaging elements comprise wet-type multiple disk clutches. The engagement or release of each of these clutches can be achieved by supplying or discharging a hydraulic fluid to or from a hydraulic chamber, which is surrounded by its piston and its cylinder holding the piston therein, and hence causing the piston to advance or retreat.

A description will next be made of the advancing and retreating motion of a piston upon supply and discharge of a hydraulic pressure to and from its associated hydraulic chamber. Where a combination of frictional elements which are selectively engaged and released are both rotary elements, the cylinder rotates at the same speed as either one of the rotary elements and both the supplied hydraulic pressure and centrifugal hydraulic pressure (the pressure produced by the centrifugal force applied to the remaining hydraulic fluid as a result of rotation) are therefore exerted upon the piston.

Even when the supplied hydraulic pressure is reduced to 0 kg/cm$^2$ in order to release the frictional elements, a piston-pushing force still remains owing to the existence of the centrifugal hydraulic pressure. In some instances, the clutch may not be fully released in a short period of time by the force of its return spring.

Further, a centrifugal pumping action may also take place as a result of the rotation of the frictional elements and the hydraulic fluid may be continuously supplied.

The clutch may be maintained in a semi-engaged state for the reasons mentioned above, leading to such inconvenience that the shifting time may become longer or the clutch may be burnt out.

As methods for solving these inconveniences, the following power transmissions have been proposed:

(1) As illustrated in FIG. 3, check valves 23 are provided outside the cylindrical walls of pistons 08,016 (or cylinders 09,017) of the clutch-operating actuator.

(2) As depicted in FIG. 4, a centrifugal hydraulic fluid chamber 012, to which hydraulic fluid of approximately atmospheric pressure is supplied, is formed, on one side of a first piston 08 of the clutch-operating actuator, the one side being opposite to a working fluid chamber 010 relative to the piston 08, by means of a partition 011 and the first piston 08 so as to compensate centrifugal hydraulic pressures to be developed in the working fluid chamber 010.

The following problems however arise when the inconvenience caused by centrifugal hydraulic pressures are tried to be overcome by the above-described methods (1) or (2). (1) With respect to the structure shown in FIG. 3:

(a) The hydraulic fluid remaining outside the check valves 23 is not discharged so that the centrifugal hydraulic pressure cannot be completely eliminated.

(b) When the hydraulic fluid is discharged, air enters the working fluid chambers 010 and 018. Accordingly, a long period of time is required to fill up the working fluid chambers 010 and 018 with the hydraulic fluid so as to bring the clutches 05 and 013 again into their engaged state. A long period of time is also required to increase the hydraulic pressure to such a level that the force applied to the balls 23a by the supplied hydraulic pressure overcomes the centrifugal forces exerted upon the balls 23a so that the check valves 23 are then closed. As a result, the shifting time becomes longer.

(c) When driving at a high rate of speed, the hydraulic fluid is drawn by the centrifugal pumping action, and the clutches 05 and 013 cannot be released unless air is fed into the working fluid chambers 010 and 018. (2) With respect to the structure illustrated in FIG. 4:

By filling the centrifugal pressure chamber 012 formed by the piston 08 and partition 011 with a hydraulic oil (for example, by introducing a usual forced lubricating oil), a centrifugal hydraulic pressure $P_1$ applied from the side of a retainer 02 to the piston 08 by the hydraulic fluid contained in the working fluid chamber 010 becomes equal to another centrifugal hydraulic pressure $P_2$ applied from the side of the partition 011 to the piston 08 by the hydraulic fluid contained in the centrifugal pressure chamber 012 so that the centrifugal hydraulic pressure applied to the piston 08 is compensated or balanced. Although the inconvenience caused by such centrifugal hydraulic pressures is solved by the above method, it is necessary to define the centrifugal pressure chamber 012 and to provide the partition 011 for defining the centrifugal pressure chamber 012. Correspondingly, the axial dimension of the actuator for the clutch 05 becomes longer and the space required for the installation of the clutch 05, that is, the overall length of the clutch 05, increases. This is extremely disadvantageous from the viewpoint of installation space especially when two or more clutches are provided or required.

OBJECT OF THE INVENTION

With the foregoing in view, the present invention has as its primary objective the provision of a power transmission making use of one or more centrifugal hydraulic pressure compensating clutches which can compensate centrifugal hydraulic pressures and can be constructed with compact dimensions.

SUMMARY OF THE INVENTION

In accordance with the primary objective of this invention, there is thus provided a power transmission comprising:

a first clutch which is actuated by a hydraulically-operated first actuator so as to engage a drive element and a first element to each other; and a second clutch which is actuated by a hydraulically-operated second actuator so as to engage said drive element and a second driven element to each other;

each of said first and second actuators being constructed of a piston for pushing its associated clutch, a cylinder in which said piston is slidably disposed, a working fluid chamber formed on one side of said piston by said piston and cylinder and adapted to receive a supply of a pressurized hydraulic fluid so as to actuate said piston in a direction that said clutch is pushed by said piston, and a centrifugal hydraulic pressure chamber formed on the other side of said piston by said piston and a partition fixed on an end portion of said cylinder and adapted to receive a supply of a fluid the pressure of which is substantially the same as atmospheric pressure; and said cylinder being formed in such a way that said working fluid chamber for said second actuator is formed on the side of the outer surface of said partition which defines said centrifugal hydraulic pressure chamber for said first actuator.

In the power transmission of this invention, the cylinder portion of the second actuator for the second clutch is formed in the partition which forms the centrifugal hydraulic pressure chamber of the first actuator for the first clutch. Therefore, centrifugal hydraulic pressures in the working fluid chambers are compensated for or balanced and at the same time, the structure of the power transmission is rendered compact.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 2:
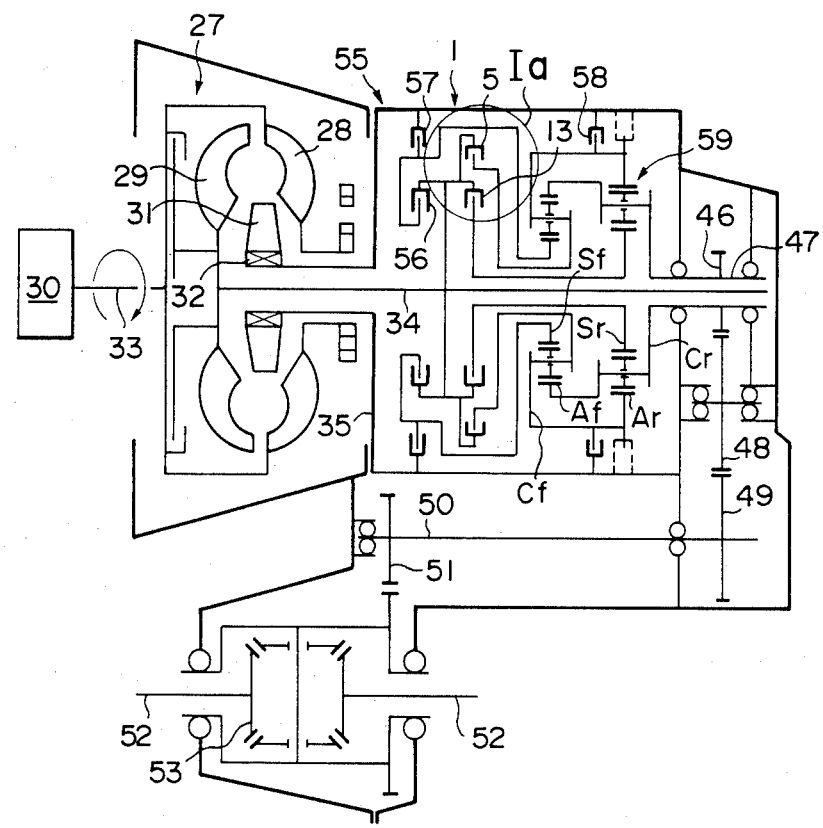
FIG. 2 is a simplified schematic view showing the overall structure of the power transmission.
Figure 3:
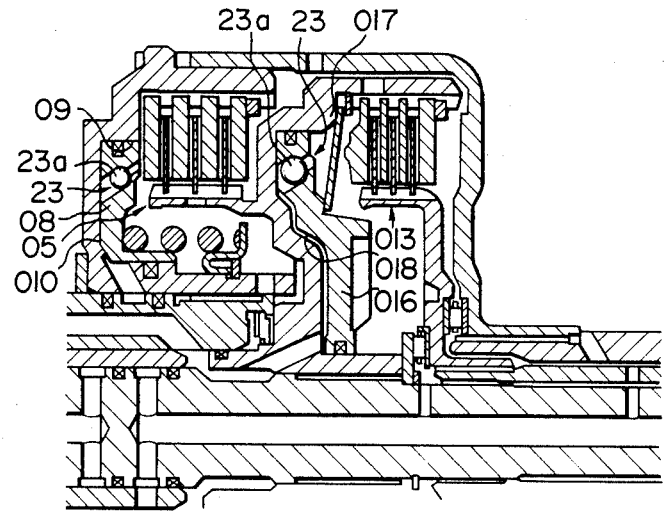
FIG. 3 is a fragmentary vertical cross-section of a conventional power transmission.
Figure 4:
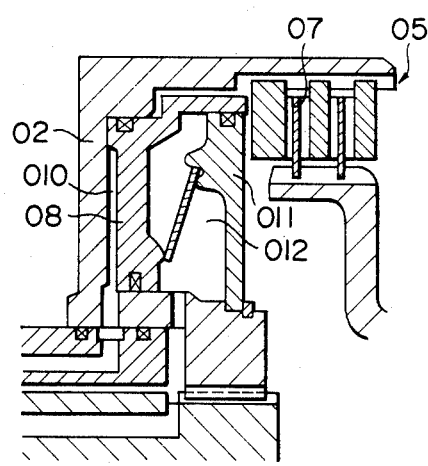
FIG. 4 is a fragmentary vertical cross-section of another convention power transmission.
Figure 5:
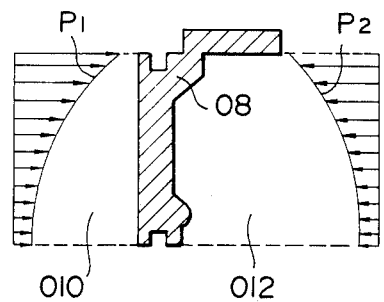
FIG. 5 is a simplified schematic view for describing the operation of the conventional power transmission of FIG. 4.

Referring first to FIG. 2, a crankshaft 33 of an engine 30 which serves as a power source of a vehicle is connected directly to a pump 28 of a torque converter 27. The torque converter 27 includes the pump 28, a turbine 29, a stator 31 and a one-way clutch 32. The stator 31 is connected to a casing 35 via the one-way clutch 32. Owing to the provision of the one-way clutch 32, the operator 31 is allowed to rotate in the same direction as the crankshaft 33 but is not allowed to rotate in the opposite direction. A torque which has been transmitted to the turbine 29 from the pump 28 is then transmitted by means of a power input shaft 34, which serves as drive element, to a change speed gear assembly 55 mounted upon the rear end of the power input shaft 34. The change speed gear assembly 55 can assume gear shift positions of four forward shift or gear speed positions and one reverse gear shift position. The change speed gear assembly 55 comprises a planetary gear mechanism 59 which is in turn composed of three clutches 5,13,56, two brakes 57,58, two sun gears Sf,Sr, two carriers Cf,Cr and two annular gears Af,Ar. A torque which has been transmitted through the planetary gear mechanism 59 is transmitted from a power output gear 46 fixedly secured upon a power output shaft 47, via an idler gear 48, to a driven gear 49, and further via a transfer shaft 50 fixedly secured to the driven gear 49 and a helical gear 51 to a differential gear unit 53 to which a drive shaft 52 is connected.

The above clutches and brakes are each composed of a frictional engaging device equipped with a cylinder device, servo device or the like which serves as an actuator therefor. Upon connection to the pump 28 of the torque converter 27, they are operated by means of hydraulic pressure which is generated by means of the oil pump driven by the engine 30. This hydraulic pressure is selectively supplied by means of an unillustrated hydraulic pressure controller to the individual clutches and brakes in accordance with the operative conditions detected by means of various sensors, whereby these clutches and brakes are operated in various combinations so as to achieve the shift positions of the four forward speed or gear shift positions and the one reverse gear shift position. The following table shows the relationship between the actuation of the individual clutches and brakes and the shift or gear positions, in which circles (O) indicate engaged clutches and/or brakes:

|  | Clutch 56 | Clutch 13 | Clutch 5 | Brake 57 | Brake 58 |
| --- | --- | --- | --- | --- | --- |
| 1st |  | O |  |  | O |
| 2nd |  | O |  | O |  |
| 3rd |  | O | O |  |  |
| 4th |  |  | O | O |  |
| Rev | O |  |  |  | O |

The outline construction and operation of an automatic transmission 1 as a power transmission has been described above. The structures of the first clutch 5 and second clutch 13, which are essential elements of the structural system of the present invention, will be described next.

Figure 1A:
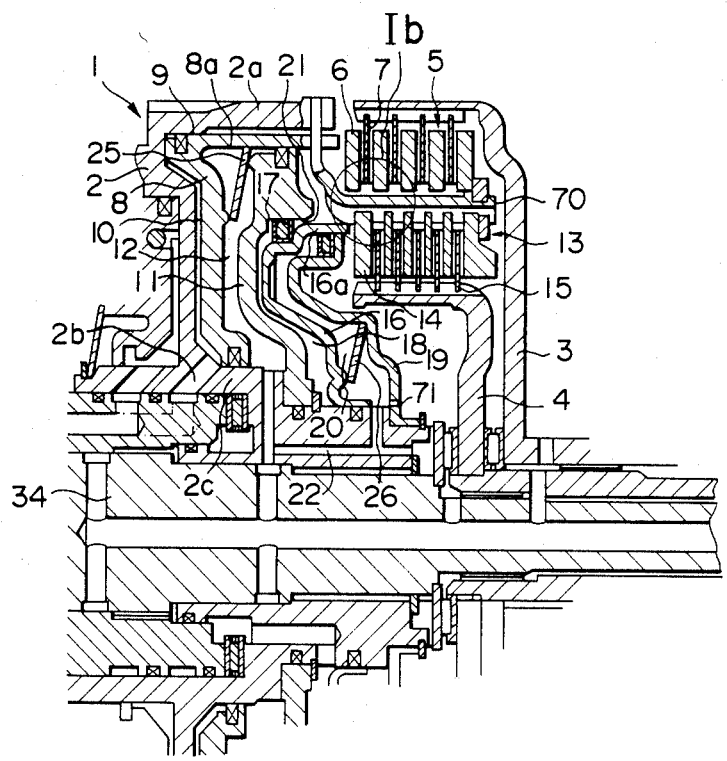
FIG. 1(a) is a vertical cross-section of an essential part (Ia in FIG. 2) of a power transmission according to one embodiment of this invention, which makes use of centrifugal hydraulic pressure compensating clutches.

As illustrated in FIG. 1(a), a first retainer 2 is mounted upon the power input shaft 34, which serves as the drive element, by means of keys and keyways. In a first cylinder 9 formed on the inner wall of a cylindrical extension 2a of the first retainer 2 which extension 2a extends in the rightward direction as seen in FIG. 1, a ring-shaped first piston 8 is slidably disposed. The inner periphery of the first piston 8 is allowed to slide on the outer wall of a boss portion 2c of the first retainer 2 along the central axis of rotation of the power input shaft 34. As a result, a first working fluid chamber 10 is formed between the first cylinder 9 and first piston 8. When hydraulic fluid is supplied to the first working fluid chamber 10 through means of a hydraulic fluid passage 2b, the first piston 8 is caused to move axially. On the outer periphery of the first piston 8, there is formed a cylindrical extension 8a which extends toward the outer end of the first cylinder 9, that is, toward a partition 11 which will be described subsequently. Thus, the outer end of the cylindrical extension 8a pushes and drives a first clutch plate 6. As a result, the first clutch plate 6 and a first clutch disk 7 are brought into frictional engagement so that the first clutch 5 is brought into an engaged state. The rotary torque of the first retainer 2 is hence transmitted via a ring-shaped connector member 70 to a second retainer 3 connected to the carrier Cf which serves as a first driven element.

Figure 1B:
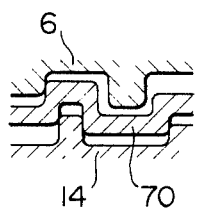
FIG. 1(b) is a schematic transverse cross-section showing a part Ib of FIG. 1(a) on an enlarged scale.

Incidentally, the end portion of the cylindrical extension 2a of the first retainer 2, the outer end portion of the cylindrical extension 8a of the first piston 8 and the outer periphery of the ring-like connector member 70 are all formed so as to have comb-like configurations, and are meshed together at the comb-like portions. Accordingly, the ring-like connector member 70 is interlocked with the first retainer 2 whereby rotary torque from the first retainer 2 is transmitted to the ring-like connector member 70 and at the same time, the outer end portion of the cylindrical extension 8a of the first piston 8 is allowed to enter the comb-like portion of the ring-like connector member 70, whereby the first piston 8 is allowed to move. The ring-like connector member 70 is formed at the side of its power output portion into a cylindrical shape having a wavy transverse cross-section as depicted in FIG. 1(b). An internally-toothed portion of the ring-like first clutch plate 6 is maintained in engagement with keys and keyways formed in the outer wall of the ring-like connector member 70 and an externally-toothed portion of a ring-like second clutch plate 14 is maintained in engagement with keys and keyways formed in the inner wall of the ring-like connector member 70, whereby the ring-like connector member 70 and the first and second clutch plates 6 and 14 are allowed to undergo relative movement in the axial direction while maintaining their engagement in the radial direction.

The ring-shaped first partition 11 is disposed internally within the inner wall of the cylindrical extension 8a of the first piston 8 and is fixedly secured to the boss portion 2c of the first retainer 2 by means of a snap ring. Thus, the first partition 11 is allowed to rotate together with the first retainer 2 and at the same time, to move along the axis of the first piston 8.

An oil seal is provided on the outer wall of the first partition 11 so as to maintain the fluid tightness between the inner wall of the cylindrical extension 8a and the outer periphery of the first partition 11 upon occurrence of their relative sliding displacement as the first piston 8 moves and at the same time, to form a first centrifugal hydraulic pressure chamber 12 between the first partition 11 and the first piston 8. Between the first piston 8 and the first partition 11, a ring-like return spring 25 is interposed so that the first piston 8 is axially biased toward the first retainer 2 when no hydraulic pressure is supplied to the first working fluid chamber 10. In addition, a cylindrical recess 21 is formed in the outer wall of the first partition 11 (that is, the side opposite to the first centrifugal hydraulic pressure chamber 12 relative to the first partition 11), in which a second piston 16 is disposed with an oil seal interposed therebetween. The cylindrical recess 21 is hence formed as a second cylinder 17. Namely, a second working fluid chamber 18 is formed by the first partition 11 and the second piston 16.

On the outer periphery of the second piston 16, there is formed a cylindrical extension 16a which extends toward the outer end of the second cylinder 17. As a result of the axial movement of the second piston 16 which is caused to occur as a result of the supply or discharge of hydraulic pressure to or from the second working fluid chamber 18, the outer end of the cylindrical extension 16a is caused to push the second clutch plate 14 or to terminate the pushing of the second clutch plate 14 so that the engagement or disengagement between a second clutch disk 15 and second clutch plate 14 is performed.

The second clutch disk 15 is maintained at its toothed inner periphery in engagement with a third retainer 4 which is coupled with the sun gear Sr which serves as a second driven element. Accordingly, rotary torque from the ring-like connector member 70 is transmitted to the third retainer 4 via the second clutch plate 14 and second clutch disk 15.

A ring-like second partition 19 is disposed on the righthand side of the second piston 16 as viewed in FIG. 1 (on the side opposite to the second working fluid chamber 18 relative to the second piston 16) and is fixedly secured to the boss portion 2c of the first retainer 2 by means of a snap ring. The second partition 19 is disposed within the inner wall of the cylindrical extension 16a of the second piston 16. The outer periphery of the second partition 19 and the inner wall of the cylindrical extension 16a of the second piston 16 are maintained in sliding and fluid-tight contact by means of an oil seal interposed therebetween. A second centrifugal hydraulic pressure chamber 20 is formed by the second partition 19 and second piston 16.

A hydraulic fluid passage 22 is formed in the boss portion 2c of the first retainer 2. One end of the passage 22 is in communication with a feed passage for a pressurized lubricating oil, and the feed passage is seen to be formed centrally and axially within the power input shaft 34. The passage 22 is also in communication at intermediate points thereof with the first centrifugal hydraulic pressure chamber 12 and second centrifugal hydraulic pressure chamber 20 and is open at the other end to atmosphere in the vicinity of the second centrifugal hydraulic pressure chamber 20. An open hole 71 is also formed through the second partition 19 at a position near the inner periphery thereof.

Since the power transmission according to the one embodiment of this invention, which makes use of the centrifugal hydraulic-pressure compensating clutches, is constructed as described above, rotary torque from the power input shaft 34 is, upon engagement of the first clutch 5 and second clutch 13, transmitted to the second retainer 3 and third retainer 4 via the first retainer 2 and ring-like connector member 70. The engagement of the first clutch 5 is effected in the following manner. High hydraulic pressure is supplied to the first working fluid chamber 10 through the hydraulic fluid passage 2b, thereby moving the first piston 8 axially toward the power output side. The outer end of the first piston 8 then pushes the first clutch plate 6 so that the first clutch plate 6 and first clutch disk 7 are brought into frictional engagement. On the other hand, the release of the first clutch 5 is performed by discharging hydraulic pressure from the first working fluid chamber 10. This is effected by causing the first piston 8 to move in the leftward direction as seen in FIG. 1 by the biasing force of the return spring 25.

Here, a centrifugal force is applied to the fluid in the first working fluid chamber 10 and a centrifugal hydraulic pressure is applied in the rightward direction as viewed in FIG. 1 to the first piston 8. Since the first centrifugal hydraulic pressure chamber 12 disposed on the opposite side of the first piston 8 is also filled with hydraulic fluid, a centrifugal hydraulic pressure is applied in the leftward direction as seen in FIG. 1 to the first piston 8 by the hydraulic fluid in the first centrifugal hydraulic pressure chamber 12. Accordingly, the centrifugal pressures applied to the first piston 8 are balanced and compensated. As a consequence, the first piston 8 is driven in the leftward direction as seen in FIG. 1 by the return spring 25 without being affected by the rightward centrifugal hydraulic pressure, whereby the release of the first clutch 5 is rapidly performed.

On the other hand, the engagement of the second clutch 13 is effected by feeding high hydraulic pressure to the second working fluid chamber 18 and driving the second piston 16. The outer end of the second piston 16 pushes the second clutch plate 14, whereby the second clutch plate 14 and second clutch disk 15 are brought into frictional engagement. Here, the first partition 11 serves functions or purposes similar to those of the retainer 2. The cylindrical recess 21 formed in the central part of the first partition 11 serves as the second cylinder 17 so that the movement of the second piston 16 can be effected without any problems.

The release of the second clutch 13 is effected by discharging the hydraulic pressure from the second working fluid chamber 18 and causing the second piston 16 to move in the leftward direction as seen in FIG. 1 by means of the return spring 26. The movement of the second piston 16 is performed smoothly because the centrifugal hydraulic pressure in the second working fluid chamber 18 is, similar to the first piston 8, compensated by the centrifugal hydraulic pressure in the second centrifugal hydraulic pressure chamber 20.

By the way, the supply of the hydraulic fluid into the first centrifugal hydraulic pressure chamber 12 and second centrifugal hydraulic pressure chamber 20 is effected through the hydraulic fluid passage 22. Since the hydraulic fluid passage 22 is in communication with the atmosphere while the first piston 8 and second piston 16 are moving, the hydraulic fluid is discharged promptly from the first centrifugal hydraulic pressure chamber 12 and second centrifugal hydraulic pressure chamber 20 so that the displacements of the first piston 8 and second piston 16 are achieved smoothly.

The discharge of the hydraulic fluid from the second centrifugal hydraulic pressure chamber 20 is effected through the open hole 71 because the hydraulic fluid passage 22 is closed by the movement of the second piston 16 in the rightward direction as viewed in FIG. 1.

By having the first partition 11 serve not only as a partition for defining the first centrifugal hydraulic pressure chamber 12 but also as a cylinder for forming the second working fluid chamber 18, the axial length of the power transmission is not substantially increased and the whole power transmission can be constructed in a compact size in spite of the provision of the first centrifugal hydraulic pressure chamber 12 and second centrifugal hydraulic pressure chamber 20.

Since the release of the first clutch 5 and second clutch 13 are effected upon down-shifting from the third gear the second gear and up-shifting from the third gear to the fourth gear when the vehicle speed is relatively high, the effects of centrifugal hydraulic pressures by the hydraulic fluid remaining in the working fluid chambers 10,18 are great. It is therefore indispensable to provide the centrifugal hydraulic pressure chambers 12,20 with the clutches 5,13 so as to compensate for the centrifugal hydraulic pressures. By using the above-described construction, the first clutch 5 and second clutch 13 can be incorporated in the automatic transmission 1 without need for any substantial dimensional enlargement.

As has been described above in detail, the power transmission of this invention has brought about the following effects or advantages:

(1) The cylinder of one of the clutches is formed in the partition of the other clutch. It is hence possible to omit one partition compared with the necessary provision of one partition with each clutch and hence to shorten the overall length.

(2) Since centrifugal hydraulic pressures occurring in each working fluid chamber can be compensated by centrifugal hydraulic pressures in its associated centrifugal hydraulic pressure chamber, the clutches can always be promptly released.

(3) One end of the hydraulic fluid passage adapted to supply hydraulic fluid to each centrifugal hydraulic pressure chamber is open to the atmosphere. Even when the volume of the centrifugal hydraulic pressure chamber changes upon displacement of its associated piston, the hydraulic fluid is discharged in an amount corresponding to the volume change and no additional resistance occurs to the displacement of the piston.

Having now fully described the invention, it will be apparent to one of ordinary skill in the art that many changes and modifications can be made thereto without departing from the spirit or scope of the invention as set forth herein.

What is claimed is:

1. A power transmission comprising:
   a first clutch which is actuated by means of a hydraulically operated first actuator so as to engage a drive element with a first driven element;
   a second clutch which is actuated by means of a hydraulically operated second actuator so as to engage said drive element with a second driven element;
   said first actuator being constructed of a first piston for actuating said first clutch, a first cylinder in which said first piston is slideably disposed, a first working fluid chamber formed upon one side of said first piston between said first piston and said first cylinder and adapted to receive a supply of pressurized hydraulic fluid so as to move said first piston in a direction such that said first clutch is actuated by said first piston, and a first centrifugal hydraulic pressure chamber formed upon the other side of said first piston between said first piston and one side of a first partition fixed upon an end portion of said first cylinder and adapted to receive a supply of fluid the pressure of which is substantially the same as atmospheric pressure; and
   said second actuator being constructed of a second piston for actuating said second clutch, a second cylinder, formed within said first partition, in which said second piston is slideably disposed, a second working fluid chamber formed upon one side of said second piston between said second piston and the other side of said first partition and adapted to receive a supply of pressurized hydraulic fluid so as to move said second piston in a direction such that said second clutch is actuated by said second piston, and a second centrifugal hydraulic pressure chamber formed upon the other side of said second piston and adapted to receive a supply of fluid the pressure of which is substantially the same as atmospheric pressure.

2. The power transmission as claimed in claim 1, wherein:

said first and second centrifugal hydraulic pressure chambers of both actuators are in communication with intermediate portions of a hydraulic fluid passage, one end of said hydraulic fluid passage is in communication with a hydraulic pressure supply source, and the other end of said hydraulic fluid passage is open to atmosphere in the vicinity of both actuators.

3. The power transmission as claimed in claim 1, wherein:

a retainer member connected to said drive element and defining said first cylinder of said first actuator, and a cylindrical member having an outer wall surface and an inner wall surface and extending from said retainer member in a direction opposite that of said drive element, are provided; and wherein further, said first clutch is disposed upon said outer wall surface of said cylindrical member and said second clutch is disposed upon said inner wall surface of said cylindrical member.

4. The power transmission as claimed in claim 1, wherein:

a retainer member, which is connected to said drive element, has a cylindrical boss portion extending toward the opposite side of said drive element and concentrically disposed about said drive element along the central axis of rotation of said drive element; and on the outer wall of said boss portion, said first piston of said first actuator, said first partition for said first centrifugal hydraulic pressure chamber of said first actuator, said second piston of said second actuator and said second partition for said second centrifugal hydraulic pressure chamber of said second actuator, all being annular, are disposed in order, from the side of said drive element toward said opposite side of said drive element.

5. The power transmission as claimed in claim 1, wherein:

a cylindrical extension is provided upon the outer wall of each piston of said first and second actuators, each of said cylindrical extensions extends toward its associated partition and is adapted to push at an outer end portion thereof its associated clutch, and the inner wall of each of said cylindrical extensions is slideably disposed in close contact with the outer periphery of its associated partition.

* * * * *